United States Patent [19]

Marshall

[11] 4,266,154

[45] May 5, 1981

[54] PERMEABLE MESH CURRENT COLLECTOR FOR DC MACHINES

[75] Inventor: Robert A. Marshall, Schenectady, N.Y.

[73] Assignee: General Electric Company, Schenectady, N.Y.

[21] Appl. No.: 31,509

[22] Filed: Apr. 19, 1979

[51] Int. Cl.³ .............................................. H02K 13/00
[52] U.S. Cl. ..................................... 310/219; 310/178
[58] Field of Search ............... 310/219, 248, 178, 249, 310/232, 250, 251; 339/5 L, 8 L; 417/50

[56] References Cited

U.S. PATENT DOCUMENTS

| | | | |
|---|---|---|---|
| 3,211,936 | 10/1965 | Harvey | 310/219 |
| 3,646,394 | 2/1972 | Swartz | 310/178 |
| 3,944,865 | 3/1976 | Jewitt | 310/178 |
| 4,024,422 | 5/1977 | Gill | 310/219 |
| 4,027,184 | 5/1977 | Hurley | 310/178 |
| 4,146,807 | 3/1979 | Hatch | 310/219 |
| 4,168,446 | 9/1979 | Hatch | 310/219 |
| 4,186,321 | 1/1980 | Marshall | 310/219 |

FOREIGN PATENT DOCUMENTS 1332786 10/1973 United Kingdom ................. 310/178

*Primary Examiner*—R. Skudy
*Attorney, Agent, or Firm*—Nathan D. Herkamp; James C. Davis, Jr.; Paul R. Webb, II

[57] ABSTRACT

A current collector for an electrical machine employs a rotor collector ring encircled by a stator collector ring to which a compliant brush fabricated of an electrically-conductive, liquid metal-permeable material is attached. Liquid metal saturates said liquid metal-permeable material and forms a thin liquid metal film which makes sliding contact with the rotor collector ring, completing contact between the rotor and stator collector rings through the compliant brush. Adequate liquid metal is maintained in the collector by pumping means supplying liquid metal through the stator collector ring.

17 Claims, 5 Drawing Figures

U.S. Patent   May 5, 1981   Sheet 1 of 2   4,266,154
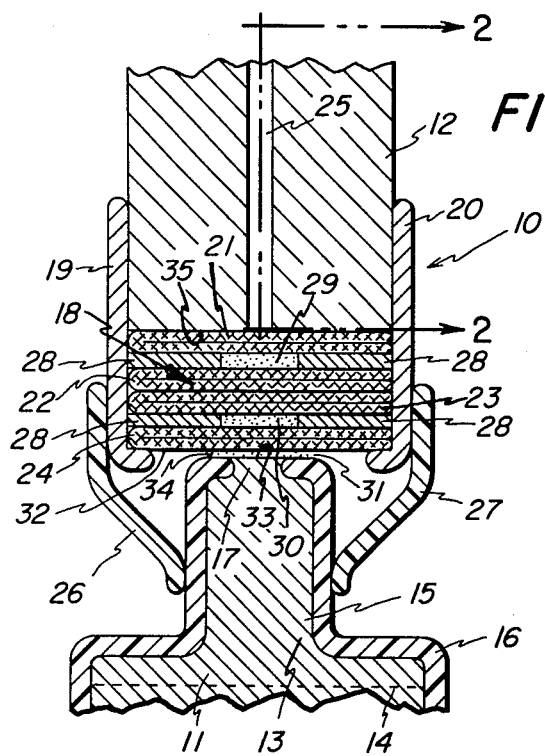
FIG. 1
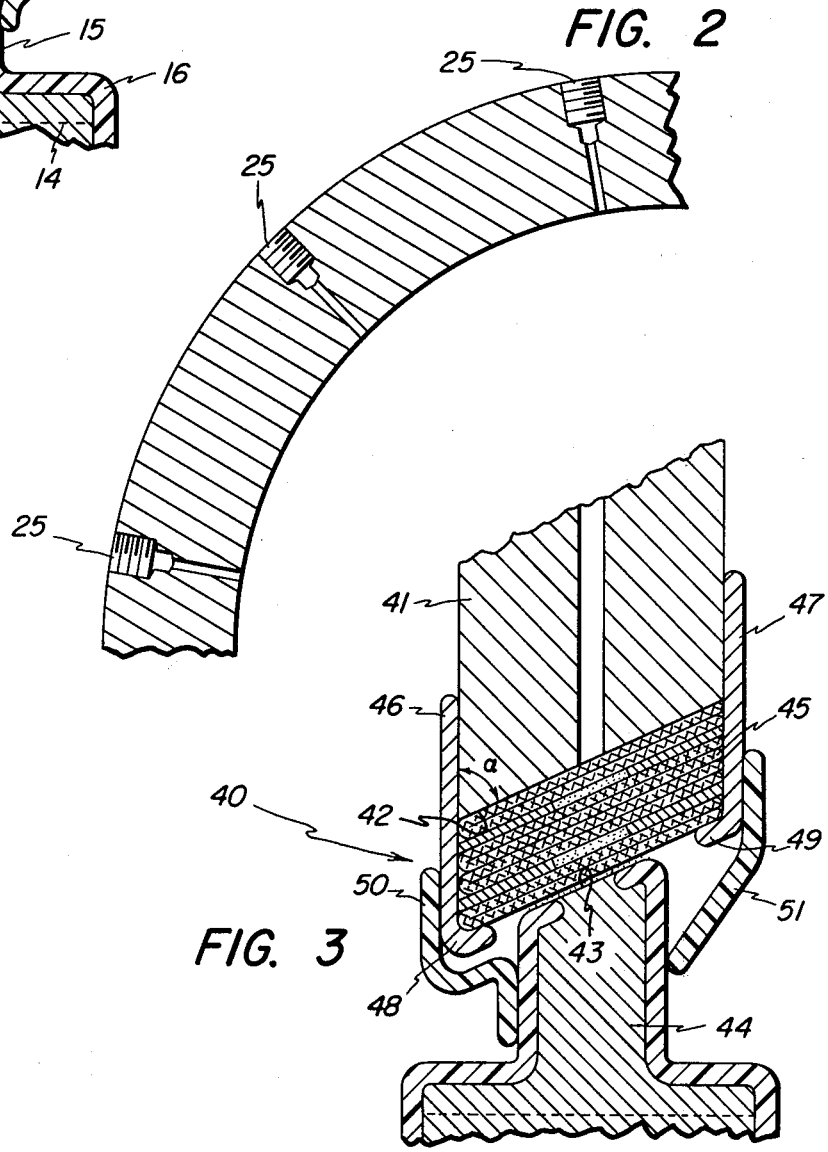
FIG. 2
FIG. 3

PERMEABLE MESH CURRENT COLLECTOR FOR DC MACHINES

This invention was made pursuant to, or under, a contract with the U.S. Navy.

BACKGROUND OF THE INVENTION

This invention relates to electrical machines employing liquid metal current collectors, and more particularly, to apparatus for maintaining electrical contact between the rotor collector ring and stator collector ring of a liquid metal current collector. A thin film of liquid metal is maintained at the innermost peripheral surface of a compliant brush which contains a continually-replenished supply of liquid metal.

In an acyclic machine using, instead of solid brushes, liquid metal current collectors in the shape of rings, the liquid metal forms a portion of the current-carrying loop. It is necessary for such current collectors to achieve adequate current collection at a current density in the liquid metal that is reasonable for that liquid metal material, so as to avoid excessive heating, and it is further desirable to minimize the area of liquid metal that contacts a relatively moving surface, so as to avoid excessive viscous drag, without requiring extremely tight tolerance in construction.

In B. D. Hatch application Ser. No. 838,714, filed Oct. 3, 1977 now U.S. Pat. No. 4,146,807, issued Mar. 27, 1979, and Ser. No. 23,809, filed Mar. 26, 1979 and both assigned to the instant assignee, liquid metal is contained within a raceway defined by a stator collector ring which includes a plurality of fins protruding radially-inward into a plurality of cage sectors, respectively, thereby essentially precluding expulsion of the liquid metal under the influence of Lorentz forces. In B. D. Hatch application Ser. No. 876,570, filed Feb. 10, 1978, now U.S. Pat. No. 4,168,446, issued Sept. 18, 1979, and assigned to the instant assignee, a narrow radial gap is maintained between each pair of rotor and stator collector rings, so that only a small quantity of liquid metal is required. Further, a compliant brush of electrically-conductive filaments is attached to the stator collector ring and extends to a position closely-adjacent the rotor collector ring, so that very little liquid metal will be expelled from the gap. The dimensional allowances for manufacturing and assembly tolerances, thermal expansion, etc., are compensated by the compliance of the brush, enabling the reduction in spacing between paired rotor and stator collector rings.

In my patent application Ser. No. 878,786, filed Feb. 17, 1978, now U.S. Pat. No. 4,186,321, issued Jan. 20, 1980, assigned to the instant assignee, and incorporated herein by reference, a collector is disclosed having a U-shaped brush of liquid metal-permeable conductive material attached to each stator collector ring and enclosing a volume of liquid metal between the stator and rotor collector rings. A thin film of liquid metal is maintained on the surface of the brush adjacent the tip of the rotor collector ring to complete contact between the rotor and stator.

The instant invention is a modification of my disclosed invention in the aforementioned U.S. Pat. No. 4,186,321. The instant invention describes brush structure to provide contact between the stator collector ring and rotor collector ring through the permeable braid or mesh, and a thin film of liquid metal maintained between the brush and the rotor contact surface. Therefore, contacts parallel or chamfered, or angled, relative to the centerline of the rotor shaft are maintained firmly in contact. My present invention will maintain the thin film gap of approximately 0.002 inch between the rotor collector and the brush throughout its length. The brush will remain substantially parallel to the rotor contact area throughout its circumference, so that no rounding of the braid at the edge of the rotor-stator contact area will occur, which could cause a larger than desired gap at the edges of the contact area. Thereby, the contact resistance is maintained low, and machine efficiency is maintained high.

Accordingly, one object of the instant invention is to provide a high efficiency, low loss current collector for a DC acyclic machine.

Another object is to provide a current collector which facilitates maintaining a constant gap between the rotor collector ring and the brush attached to the stator collector ring.

SUMMARY OF THE INVENTION

Briefly, in accordance with a preferred embodiment of my invention, an electrical current collector for an acyclic machine comprises a rotor collector ring and a stator collector ring concentrically encircling the rotor collector ring. A brush fabricated of porous, compliant, liquid metal-permeable, conductive material is attached contiguous to the stator collector ring and extends radially-inward to a position closely adjacent said rotor collector ring and spaced therefrom. Liquid metal supplied to the liquid metal-permeable brush saturates the brush and forms a thin film making contact between the rotor collector ring and the innermost periphery of the brush. Means are provided to maintain a supply of liquid metal in the brush to replace liquid metal lost through the porous brush material. In a preferred embodiment, means are located within the brush for focusing flow of liquid metal toward the rotor contact area.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a cross sectional view of the current collector of the instant invention;

FIG. 2 is a partial cross sectional view of a stator collector ring taken along line 2—2 of FIG. 1;

FIG. 3 is a cross sectional view similar to FIG. 1 and showing a modification of the current collector of the instant invention;

MANNER AND PROCESS OF MAKING AND USING THE INVENTION

Figure 4:
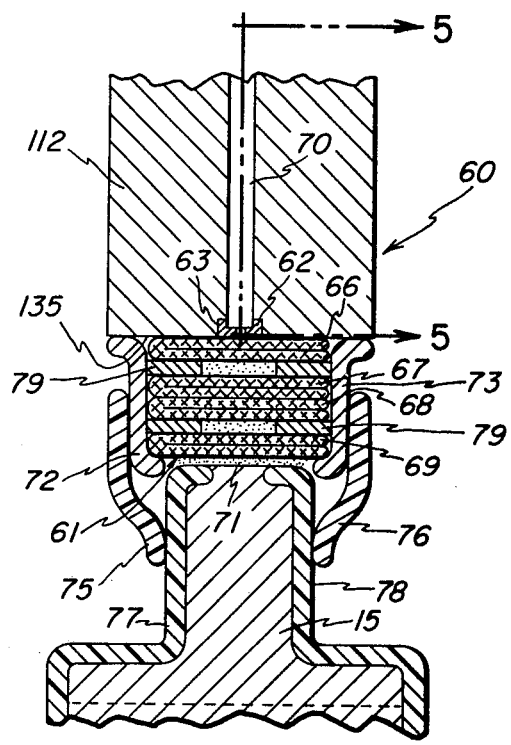
FIG. 4 is a cross sectional view of an alternative embodiment of the instant invention.

The specific features of the instant invention described herein and shown in FIGS. 1-5 are merely exemplary, and the scope of the invention is defined in the appended claims. Throughout the description and FIGS. 1-5 like reference characters refer to like elements of the invention.

In FIG. 1 a current collector 10 for an acyclic machine, having a rotor collector ring 11 and a stator collector ring 12 encircling the rotor collector ring is shown. The rotor rotates about an axis of rotation (not shown), with the rotor and stator collector rings being concentric thereabout. The rotor collector ring may be made of iron or an alloy thereof and have, as part thereof, a ring 13 of copper or an alloy thereof forming the radially-outer circumference thereof (i.e., outwardly of dashed line 14) to provide high conductivity at the current collector. Alternatively, the entire rotor collector ring 11 may be made of copper or copper alloy. Ring 13 includes a narrowed rotor tip 15 projecting radially-outward toward the stator collector ring 12. The external surface of the rotor collector ring 11 is coated with an insulating layer 16, except for a circumferential area on the radially-outermost surface of rotor tip 15 forming an annular contact surface 17 around the circumference of rotor collector ring 11. The insulation typically comprises a ceramic coating, such as sprayed alumina, which is subsequently vacuum-impregnated with an epoxy insulation.

A brush 18 is attached contiguous with the radially-inner surface 35 of stator collector ring 12 by brush holders comprising nonporous, conductive members 19 and 20 secured (e.g., welded) to the axial sides of stator collector ring 12. Brush 18 comprises at least one porous layer of compliant, conductive filaments, and preferably a plurality of layers 21, 22, 23 and 24, as shown in FIG. 1. Brush 18 is of plaited construction and may comprise flat copper braid, available from New England Electric Wire Corporation, Lisbon, New Hampshire. The braid is preferably flattened and folded over before being affixed contiguous to and in electrical contact with surface 35 of stator collector ring 12. Thereby, each of layers 21, 22, 23 and 24 actually is a double thickness of the braided copper filaments. Since the filamentary material of brush 18 must be fully compatible with the preferred liquid metal, such as sodium-potassium eutectic (NaK), for example, to be employed therewith, it must exhibit long performance life in the liquid metal, so as to provide very low electrical resistance at the collector site. Materials other than copper, which therefore may be employed as filaments of the braid, are metallurgically-bonded copper coated steel wire (e.g. 60% steel, 40% copper) and chromium copper alloy. For copper braid, size 48-8-36 has been found well suited for utilization in the invention. Also, various surface finishes, such as electroplated gold, silver, tin, nickel, etc., may be applied to both the solid and compliant copper or copper alloy surfaces of the collector to enhance wettability of these surfaces by the liquid metal and reduce electrical resistance at the collector site.

Stator collector ring 12 contains a plurality of radially-oriented passages 25 therein, each of which is in flow communication with the pores within brush 18 formed by the mesh construction of the layers of woven filaments. Each of passages 25 is connected to a source of liquid metal and a liquid metal pump (not shown) for supplying a pressurized flow of liquid metal to brush 18, as shown in my aforementioned U.S. Pat. No. 4,186,321. Excess liquid metal leaving brush 18 is collected as described in U.S. Pat. No. 4,186,321 and returned to the liquid metal supply apparatus.

Although not essential to the invention or its operation, flexible, nonconductive containment strips 26, 27 may be affixed (e.g., by adhesive bonding) to members 19 and 20, respectively, and biased into contact with the axial sides of rotor collector ring tip 15, to retain the liquid metal at the brush-rotor interface to ensure adequate current-carrying capacity in the collector. Containment strips 26, 27 may be made of glass or textile mesh, or of metallic wires coated with insulation, such as alumina, and woven into a mesh. These containment strips 26, 27 may only be desirable in low speed machines due to viscous drag losses in high speed machines.

Although not essential, a pair of spaced conductive solid metallic shims 28 may be inserted between consecutive layers of wire mesh to focus flow of liquid metal from passages 25 therebetween through the center of the brush via the openings 29, 30 located between shims 28 and toward narrow gap 31 separating the radially-outermost surface 33 of rotor collector ring 11 from the radially-innermost surface 32 of brush 18.

Within gap 31 is located a very thin film 34 of liquid metal. Narrow gap 31 (e.g., 0.002 inch thickness) is maintained by the resilience of the plaited metal layers of brush 18. As rotation begins, liquid metal is drawn around the periphery of brush 18 by both frictional and magnetohydrodynamic forces so as to provide continuous electrical connection from stator collector ring 12 through brush 18 to the entire circumferential contact ring 17 on rotor collector ring 11. Narrow gap 31 between rotor contact area 17 and the inner surface 32 of brush 18 is easily filled with liquid metal and maintained full, since its small thickness frictionally retards escape of the liquid metal under the influence of Lorentz axial expulsion forces.

The number of inlet passages 25 required is determined by the resistance to circumferential flow of the liquid metal within the brush. If the brush is fabricated of braid, which, when in place, has filaments generally axially aligned with the axis of rotation of the rotor, a larger number of inlet passages 25 would be required to maintain a constant supply of liquid metal throughout the circumference of the current collector than if the braid, when in place, has filaments generally in alignment extending generally circumferentially about the current collector. Resistance to circumferential flow of the liquid metal within the brush would be reduced with the filaments extending generally in the circumferential direction.

Dimensional allowances for manufacturing, assembly, thermal expansion, etc., are provided by using fine, highly conductive filaments (e.g., wires of approximately 0.005 inch diameter) in layers 21, 22, 23 and 24 of brush 18. Large dimensional allowances may be provided by adding or reducing the number of layers of plaited filaments in brush 18. Brush filaments conduct electrical current between stator collector ring 12 and the thin liquid metal film 34. The relatively high conductivity of the brush filaments with respect to that of the liquid metal results in a relatively low electrical loss in brush 18, the resistance of the brush being but several microhms. At initial assembly rotor collector ring 10 is initially in contact (e.g., a 0.005 inch interference fit) with brush 18. As rotation of rotor collector ring 10 progresses, the material of brush 18 becomes pushed back and worn away by the relatively harder rotor collector ring material (e.g., the ceramic insulation surface, typically sprayed alumina, at the axial boundaries of rotor tip 15). The push back of brush 18 causes deformation thereof, and wear eventually removes the elastic contact pressure exerted by the spring back of brush 18 against rotor collector ring tip 15, so that even the very slight eccentricity of rotor tip 15 results in a very thin gap between the rotor tip 15 and brush 18 at their region of mutual electrical (though not direct physical) contact. Rotor tip 15 is preferably machined to be concentric within 0.001" Total Indicator Reading (i.e., with radial accuracy of ±0.0005") with the axis of rotation. If the machine is disassembled, and upon reassembly the eccentricity of the rotor collector ring with respect to the stator collector ring differs from the original position, the inner surface 32 of brush 18 will again resiliently contact surface 33 of rotor tip 15 until the brush was worn again to produce the narrow gap 31.

In FIG. 3 is shown a modification of the collector illustrated in FIG. 1. The collector 40 is intended for use at those points in the machine, where the magnetic flux lines intersect the current collectors at an angle not parallel to the longitudinal axis of the machine. As shown in FIG. 3, surface 42 of stator collector ring 41 and surface 43 of rotor collector ring 44 are at an angle $\alpha$ to the plane perpendicular to the axis of rotation of the machine. Brush 45 is affixed in a manner similar to that of brush 18 illustrated in FIG. 1 described above. Brush holding members 46 and 47 have ends 48 and 49, respectively, bent at an appropriate angle to secure the layers of plaited wire contiguous to stator collector ring surface 42. Containment strips 50 and 51 may be attached to members 48 and 49, respectively, so that when the machine is assembled, strips 50 and 51 confine a volume of liquid metal at the current collector site.

By chamfering the tips of the current collector rings as shown in FIG. 3, the surface of each of the collector rings is at an angle approximately parallel to the flux lines intersecting the current collector. This eliminates any EMF generated at the current collector creating eddy currents which would heat the tips of the current collectors adding to losses of the collectors and therefore reducing the machine efficiency.

Figure 5:
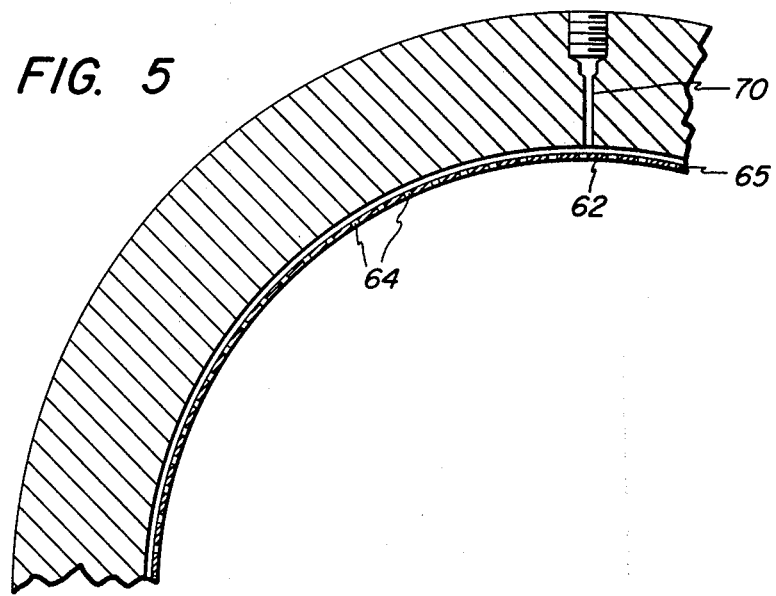
FIG. 5 is a partial cross sectional view of the stator collector ring of the embodiment shown in FIG. 4 taken along line 5—5 of FIG. 4.

In FIGS. 4 and 5 is shown an alternative embodiment of the current collector 60 utilizing a different structure for distributing liquid metal throughout the brush 61. In the embodiment shown in FIGS. 4 and 5, a channel 62 is located in a circumferential groove 63 around the radially-inner surface 135 of stator collector ring 112. Channel 62 has a plurality of circumferentially-spaced holes 64 located around the radially-inner wall 65 thereof in flow communication with the plaited layers 66, 67, 68, 69 of brush 61. A single inlet passage 70 for the liquid metal is provided and channel 62 secures distribution of the liquid metal around the radially-outer circumference of brush 61. A single inlet passage for each collector may suffice, or a plurality may be used to accommodate machine design. Liquid metal under pressure from the supply flows through holes 64 into brush 61 to supply a continuous film 71 of liquid metal at the brush-rotor collector interface.

Brush 61 is secured by brush holding members 72, 73 affixed to surface 63 of stator collector ring 112 by welding or other suitable technique. Alternatively, the holding members could be manufactured as part of the stator collector ring by machining an enlarged circumferential groove in the radially inner surface of the stator collector ring, placing a brush in the groove and rolling the edges of the holding members over the axially outer edges of the brush. Containment strips 75, 76 may be attached to members 72, 73, respectively, and resiliently biased against the axial sides 77, 78, respectively, of rotor collector tip 15. By so designing the brush and brush holders, no structure projects beyond the axial sides of the stator collector ring, and so the collectors may be axially stacked immediately adjacent each other. As in the embodiment of FIG. 1, shims 79 may be used to further focus the flow of liquid metal, or may be omitted, if desired.

In an acyclic machine, a plurality of current collectors, as shown in FIGS. 1, 2 and 3, would be located along the inner surface of the stator collector. The brush of each collector would be aligned to be parallel with flux lines passing through the collector. For example, in a quadrupole machine the collectors at each end and at the center of the machine would have the largest tilt (i.e., smallest angle $\alpha$, as shown in FIG. 3) and those collectors located around the axial center of the excitation coil would have contact surfaces parallel to the axis of rotation. The instant invention enables angled collector surfaces to be accommodated without losing the constant pressure produced by the liquid metal and the compliant brush on the rotor collector surface. It will be appreciated by those skilled in the art, that the groove and channel structure shown in FIGS. 4 and 5 could be incorporated into the embodiments of my invention shown in FIGS. 1, 2 and 3.

When the acyclic machine is operated at high speed, the liquid metal is fed over the periphery of rotor collector ring contact surface 17 facing brush 18. Lorentz expulsion forces acting on the liquid metal in each of the narrow gaps in the collectors, respectively, tend to force a flow of liquid metal from one axial side of the current collectors through the narrow gap between the brush and the rotor tip to the other axial side of the current collector. The Lorentz expulsion forces result from interaction of direct current flowing between the rotor and stator collector rings and the circumferential magnetic field produced by the same current in all of the current collectors of the machine. These Lorentz expulsion forces have essentially no effect on liquid metal situated within the brushes 18, since baffles 28 tend to focus the flow of liquid metal through the center of the brush. Thereby, liquid metal is prevented from accumulating at one side of the brush and continuity of the thin film of liquid metal between the brush and rotor collector ring surface is enhanced. Since the filaments of the brush are more conductive than the liquid metal, the current tends to pass through the conductive filaments rather than the liquid metal, so that the liquid metal within the brush experiences only very weak Lorentz forces, and is thus not forced axially outward to any significant extent. Containment strips 26, 27 maintain the liquid metal in the immediate area of the rotor-stator contact thereby maintaining good low resistance contact in the high magnetic fields experienced by the current collector. By thus maintaining the thin film between the contact area 17 of the rotor collector ring and the brush 18, constant low resistance contact is maintained in each of the current collectors.

Presence of an axial magnetic field, as produced by an axial coil (not shown) in the acyclic machine, together with radial current flow through liquid metal in the thin gaps between rotor collector ring and each of the brushes results in torquing forces acting on the liquid metal. These torquing forces rotate the liquid metal circumferentially about the rotor collector ring, thus spreading the liquid metal through a 360° arc about the rotor collector ring tip. In addition to the above-described advantages of my invention, cooling of the acyclic machine by the liquid metal is greatly enhanced by this distribution and recirculation of the liquid metal.

BEST MODE

The best mode I contemplate for my invention incorporates the attachment technique and brush structure illustrated in FIGS. 1, 2 and 3. The preferred liquid metal is sodium potassium eutectic (NaK). The compliant material is a plurality of plaited copper filament layers separated by shims to focus the flow of NaK through the brush. The current collectors have contact surfaces angled as shown in FIG. 3 to a plane approximately parallel to the direction of flux lines passing through the machine at the location of the current collector.

I claim:

1. An electrical current collector for an electrical machine having a stator and a rotor, said rotor being rotatable relative to said stator about an axis thereof, comprising:
   a rotor collector ring;
   a stator collector ring encircling said rotor collector ring;
   brush means affixed to said stator collector ring contiguous with the radially-inner surface thereof; said brush means comprising at least one layer of porous, compliant, electrically conductive, liquid metal-permeable material, disposed in face-to-face contact with said radially-inner surface of said stator collector ring and extending radially-inward to a location closely adjacent said rotor collector ring, and spaced therefrom by a narrow annular gap; and
   liquid metal supply means in flow communication with said brush means for supplying liquid metal thereto; said liquid metal filling the interstices of said porous, liquid metal-permeable material and flowing therethrough to fill said gap between said brush means and said rotor collector ring, thereby establishing electrical contact between said rotor collector ring and said brush means.

2. The apparatus of claim 1 wherein:
   said brush means comprises a plurality of layers of porous, compliant, electrically conductive, liquid metal-permeable material secured to said stator collector ring by a holder affixed to said stator collector ring; and
   said holder comprises first and second nonporous, conductive brush holding members said first brush holding member being affixed to one axial side of said stator collector ring, and said second brush holding member being affixed to the opposite axial side of said stator collector ring, said brush holding members projecting radially-inward beyond the radially-inner surface of said stator collector ring to form a circumferential channel for holding said brush contiguous with said surface.

3. The apparatus of claim 2 wherein said liquid metal-permeable material comprises a mesh of conductive filaments.

4. The apparatus of claim 3 wherein the filaments comprise copper wires plaited into braid.

5. The apparatus of claim 4 wherein said brush means further comprises a pair of solid, flexible baffle means of conductive material located between alternate pairs of said layers, and axially adjacent said first and second brush holding members, respectively, to form an open passage through the axially central portion of said brush means to direct flow of liquid metal through said open passage; and wherein said liquid metal comprises a sodium-potassium eutectic alloy.

6. The apparatus of claim 5 further comprising nonconductive liquid metal containment means attached to the axially-outer surface of each of said first and second brush holding members, respectively, for confining said liquid metal within a region surrounding the radially-outer surface of said rotor collector ring.

7. The apparatus of claim 6 wherein said containment means comprise flexible, insulating strips having one end thereof biased against an axial surface of said rotor collector ring.

8. The apparatus of claim 1 wherein:
   said brush means comprises a plurality of layers of porous, compliant, electrically conductive, liquid metal-permeable material secured to said stator collector ring by a holder affixed to said stator collector ring; and
   said holder comprises first and second nonporous, conductive brush holding members, said first brush holding members being affixed to the radially-inner surface of said stator collector ring at one axially outermost portion of said surface, and said second brush holding member being affixed to the radially-inner surface of said stator collector ring at the other axially outermost portion of said surface, said brush holding members projecting radially-inward from said surface and forming a circumferential channel for holding said brush contiguous with said surface.

9. The apparatus of claim 8 wherein:
   said liquid metal-permeable material comprises a mesh of fine copper wires plaited into braid; and
   said brush further comprises a pair of solid, flexible baffle means of conductive material located between said alternate pairs of layers and axially adjacent said first and second brush holding members, respectively, to form an open passage through the axially central portion of said brush means and to direct a flow of liquid metal through said open passage; and wherein said liquid metal comprises a sodium-potassium eutectic alloy.

10. An electrical machine having a stator and a rotor, said rotor being rotatable relative to said stator about an axis thereof, and having a plurality of electrical current collectors for making electrical contact between said stator and said rotor, said current collectors comprising:
    a plurality of axially spaced rotor collector rings;
    a plurality of stator collector rings encircling said rotor collector rings, respectively;
    a plurality of brush means attached, respectively, to each of said stator collector rings contiguous with the radially-inner surface thereof; each of said brush means comprising at least one layer of porous, compliant, electrically conductive, liquid metal-permeable material disposed in face-to-face contact with said radially-inner surface of one of said stator collector rings, respectively, and extending radially-inward to a location closely adjacent a respective one of said rotor collector rings and spaced therefrom by a narrow annular gap; and
    liquid metal supply means in flow communication with said plurality of brush means to continuously supply liquid metal thereto; said liquid metal filling the interstices of each of said brush means and flowing therethrough to fill each said gap thereby establishing electrical contact between each said rotor collector ring and each said brush means, respectively.

11. The apparatus of claim 10 wherein the radially-innermost surface of each respective stator collector ring is parallel to the radially-outermost surface of the rotor collector ring encircled thereby, respectively, and said surface of said stator collector ring and said surface of said rotor collector being generally parallel to the direction of flux lines produced by an excitation coil located within said rotor which pass through the narrow gap located between said surfaces.

12. The apparatus of claim 11 wherein said liquid metal supply means includes pumping means in flow communication with inlet passages in each of said stator collector rings to provide a pressurized flow of liquid metal to each of said brush means.

13. The apparatus of claim 12 wherein said liquid metal comprises a sodium-potassium eutectic alloy.

14. The apparatus of claim 13 wherein each said brush means is affixed to said respective stator collector ring by a brush holder so that each of said layers of said brush means is held generally parallel to said radially-innermost surface of said respective stator collector ring; and each said holder comprises first and second nonporous, conductive brush holding members, said first brush holding member being affixed to one axial side of said stator collector ring, and said second brush holding member being affixed to the opposite axial side of said stator collector ring, said brush holding members projecting radially-inward beyond the radially-innermost surface of said stator collector ring to form a circumferential channel for holding said brush contiguous with said radially-innermost surface.

15. The apparatus of claim 14 wherein each said brush means comprises a plurality of stacked layers of fine copper wires plaited into a braid.

16. The apparatus of claim 14 wherein each said brush means comprises a plurality of stacked layers of fine copper wires coated with a material selected from the group consisting of gold, silver, tin and nickel, said wires being plaited into a braid.

17. The apparatus of claim 14 wherein each said brush means comprises a plurality of stacked layers of fine wires of metallurgically-bonded, copper-coated steel wires plaited into a braid.

* * * * *